March 3, 1942.     E. R. BERGMANN     2,275,245
FEEDING MECHANISM FOR SHAKER OR JIGGING CONVEYERS
Filed Oct. 19, 1939     2 Sheets-Sheet 1
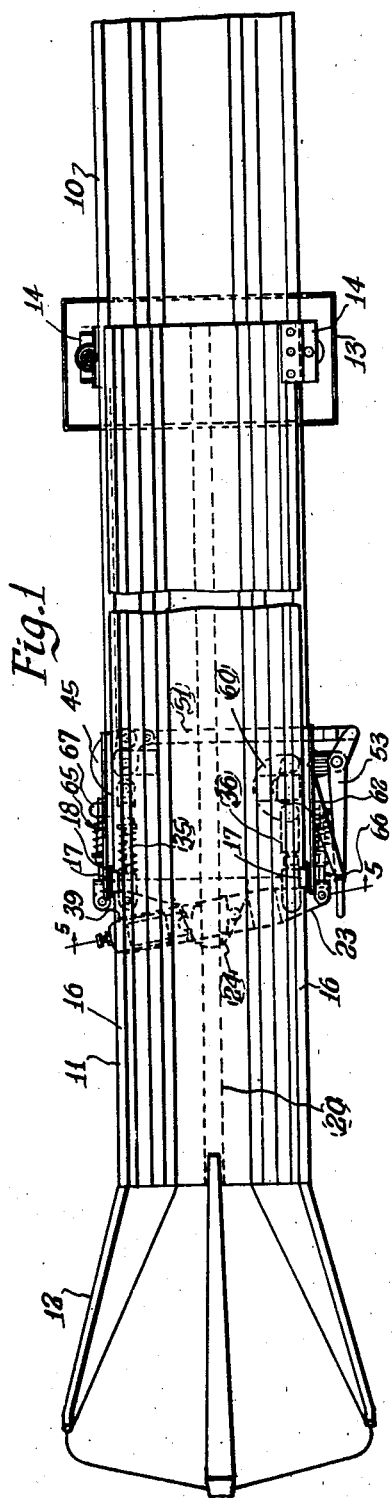
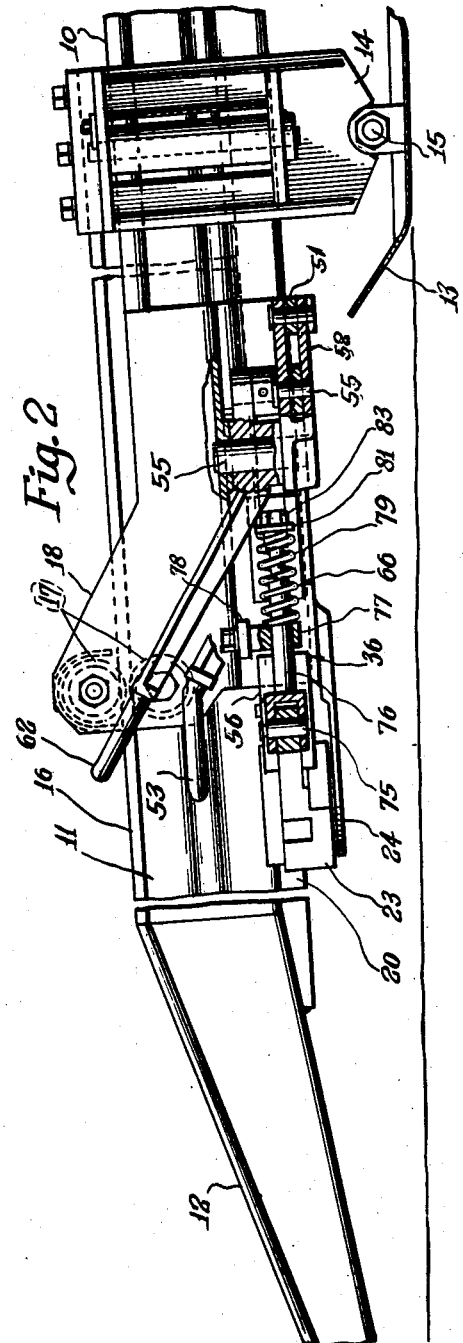
INVENTOR
*Ernst R. Bergmann*
BY
*Clarence F. Poole*
ATTORNEY

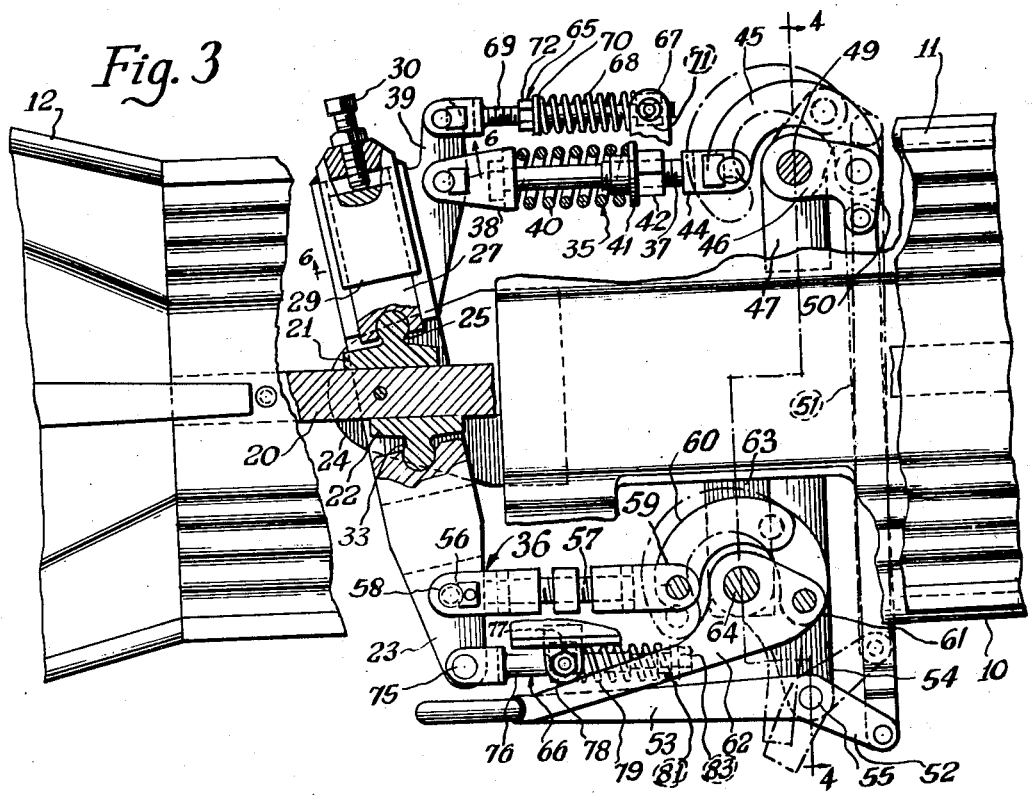
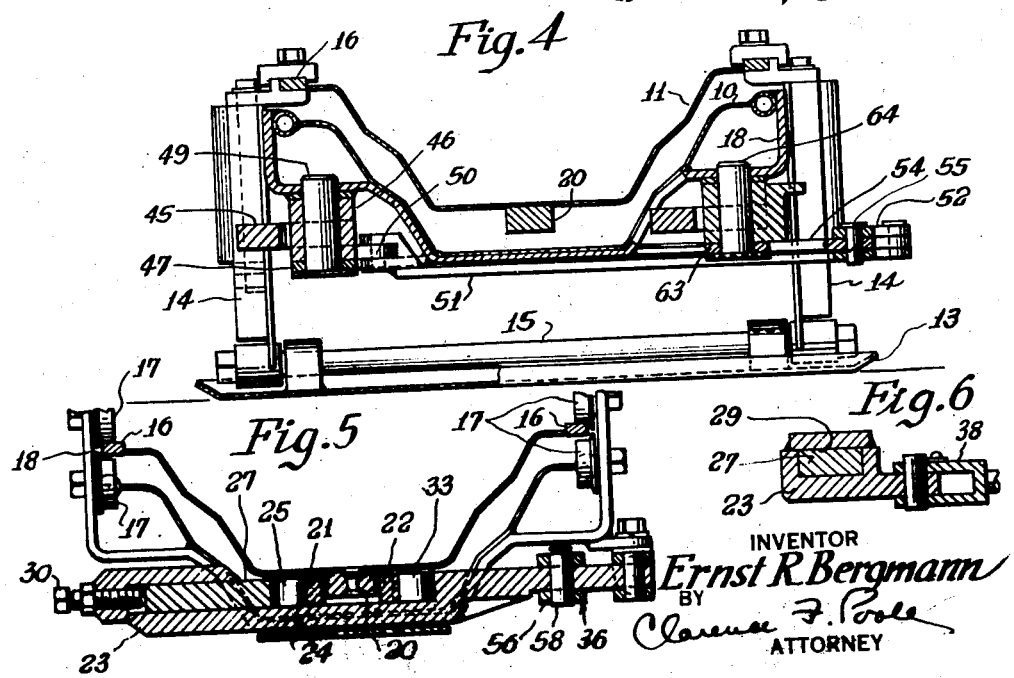

Patented Mar. 3, 1942

2,275,245

UNITED STATES PATENT OFFICE 2,275,245

FEEDING MECHANISM FOR SHAKER OR JIGGING CONVEYERS

Ernst R. Bergmann, Chicago, Ill., assignor to Goodman Manufacturing Company, Chicago, Ill., a corporation of Illinois Application October 19, 1939, Serial No. 300,105

12 Claims. (Cl. 198—220)

This invention relates to improvements in feeding mechanisms for shaker or jigging conveyers of the type utilized for picking up and transporting loose material such as coal, rock, or the like.

The principal objects of my invention are to provide a novel and simplified form of feeding device of the friction grip type, adapted to automatically extend or retract an extensible trough section with respect to a reciprocating trough section of a shaker conveyer, solely by reciprocable movement of the conveyer, which is of a more compact arrangement than formerly and includes a simpler means for actuating the gripping mechanism and controlling feeding of the extensible trough section in either direction.

Other objects of my invention will appear from time to time as the following specification proceeds, and with reference to the accompanying drawings wherein:

Figure 1 is a plan view of the in-by end of a shaker conveyer trough line having a feeding device constructed in accordance with my invention associated therewith;

Figure 2 is an enlarged fragmentary view in side elevation of the device shown in Figure 1, with certain parts broken away and certain other parts shown in longitudinal section;

Figure 3 is a plan view of the device shown in Figure 1, drawn to substantially the same scale as Figure 2, with certain parts broken away and certain other parts shown in horizontal section, in order to more clearly illustrate certain details of my invention;

Figure 4 is a sectional view taken substantially along line 4—4 of Figure 3;

Figure 5 is a fragmentary sectional view taken substantially along line 5—5 of Figure 1; and Figure 6 is a fragmentary sectional view taken substantially along line 6—6 of Figure 3.

In the embodiment of my invention illustrated in the drawings, the main elements thereof include a reciprocating trough section 10 connected to the forward end of a shaker conveyer trough line (not shown). An extensible trough section or pick-up member 11 is adapted to be telescopically extended or retracted with respect to said reciprocating trough section and is provided with a forwardly projecting flared shovel 12 at its forward end, which is adapted to rest on and slidably move along the ground.

The extensible trough section or pick-up member 11 is supported above the ground at its rear end on a shoe 13, which shoe has the lower ends of a pair of spaced apart legs 14, 14 pivotally mounted thereon on a transverse shaft 15. The upper ends of said legs extend upwardly along opposite sides of said extensible trough section and are secured to opposite upper bearing plates 16, 16, extending along and projecting laterally from the upper sides of said extensible trough section. The entire weight of said extensible trough section thus rests on the ground on the shovel 12 at its forward end and on the shoe 13 at its rear end.

The reciprocating trough section 10 is supported at its forward end for free reciprocable movement along said extensible trough section and guided against vertical displacement with respect to said trough section by means of two pairs of rollers 17, 17. Said pairs of rollers are mounted on opposite sides of the forward end of a bracket 18 secured to the forward end of said reciprocating trough section. Said bracket extends around the bottom and upwardly along opposite sides of said reciprocating trough section. The lower of said pairs of rollers is adapted to be engaged by the underside of the bearing plates 16, 16, which extend laterally from the upper flanges of said extensible trough section and form a rolling support therefor, and the upper rollers of said pairs of rollers are spaced upwardly from said bearing plates and are adapted to prevent upward movement of said extensible trough section with respect to said reciprocating trough section. Said bracket likewise forms a mounting for the mechanism for extending or retracting said extensible trough section with respect to said reciprocating trough section, which mechanism is herein shown as being disposed beneath said reciprocating trough section.

Referring now in particular to the novel form of feeding mechanism of my invention, a bearing bar 20 is herein shown as being secured to the underside of the extensible trough section 11 and extending longitudinally along the longitudinal center thereof. Opposite faces of said bearing bar are adapted to be engaged by a pair of friction grip blocks 21 and 22, for extending or retracting said extensible trough section with respect to said reciprocating trough section. Said grip blocks are mounted in a carrier member 23, herein shown as extending transversely of the conveyer. A plate 24 extends forwardly from the bracket 18 beneath said carrier member to prevent sagging of said carrier member and grip blocks with respect to said bearing bar.

The grip block 21 is provided with a boss 25 projecting from its edge opposite its edge which is adapted to engage said bearing bar. Said boss has an arcuately formed face which is adapted to engage a corresponding arcuately formed socket in the inner end of a block 27. Said block is mounted in said carrier member for slidable movement with respect thereto in a guide generally indicated by reference character 29. A set screw 30, threaded in an end of said carrier member, engages the end of said block opposite from the grip block 21, to form an adjusting member for said grip block.

The opposite grip block 22 is provided with an arcuately formed boss 33 projecting from its edge opposite from said bearing bar. Said boss is adapted to engage a corresponding arcuately formed socket in the carrier member 23.

A pair of links 35 and 36, pivotally connected to the carrier member 23 adjacent opposite ends thereof, is provided to engage the grip blocks 21 and 22 with the bearing member 20, during certain strokes of the conveyer, to extend or retract the extensible trough section 11 with respect to the reciprocating trough section 10.

The link 35 is of the spring link type, and its spring is of such strength that under normal operating conditions, said link will act as a solid member, but will yield when the forward end of the shovel 12 engages a solid obstruction, to prevent buckling of the trough line or damage to the feeding mechanism and conveyer drive. Said link consists of a longitudinally extending bolt 37 slidably extending through a yoke 38, and abutting the inner side of said yoke at its head. Said yoke is pivotally connected to a rearwardly and outwardly projecting arm 39 of the carrier member 23 and is yieldably held from movement with respect to said bolt by means of a compression spring 40, encircling said bolt and interposed between said yoke and a collar 41. Adjustment of said spring is effected by means of a nut 42 abutting the rear face of said collar.

Positioning of the link 35 to an operative or inoperative position is effected by means of an arcuate shaped link 45 and a rocking lever 46 controlled by a hand lever 53. Said arcuately formed link is pivotally connected to a yoke 44, herein shown as being threaded on the end of said bolt opposite from the yoke 38. The opposite end of said arcuately formed link is pivotally connected to the rocking lever 46, which is mounted at one of its ends on a vertical rock shaft 49. Said shaft extends through the bracket 18 at its upper end and is mounted at its lower end in a bracket 47, herein shown as being welded to the bracket 18, and spaced below the portion of said bracket through which the upper end of said shaft extends. Said rocking lever has an arm 50, extending inwardly from the point of connection of said arcuate link thereto, to which is pivotally connected a connecting link 51 extending transversely of said extensible trough section. The opposite end of said connecting link is pivotally connected to a lever arm 52 of the hand lever 53, which is pivotally mounted on a bracket 54 by means of a vertical pin 55.

The link 36, as herein shown, includes a yoke 56 threaded on one end of a threaded member 57 and pivotally connected to the carrier member 23 by means of a pivotal pin 58. A yoke 59 is threaded on the opposite end of said threaded member and is pivotally connected to a forward end of an arcuately formed link 60. Suitable nuts are provided to lock said yokes from movement with respect to said threaded member. The opposite end of said arcuately formed link is pivotally connected to one lever arm 61 of a hand lever 62. The function of said hand lever and arcuately formed link is to position the link 36 in an operative or inoperative position and hold it in such a position. Said hand lever is mounted on a vertical rock shaft 64, disposed beneath the upper flange of the reciprocating trough section 10, and mounted intermediate its ends in a bracket 63, secured to the bracket member 18.

The carrier member 23 is urged in the forwardly inclined position shown in Figure 3, by means of yieldable links 65 and 66 connected between the bracket 18 and opposite ends of the carrier member 23. The purpose of said links is to urge the carrier member 23 in the inclined position shown in Figure 3, one of said links being operative when feeding in one direction and the other of said links being operative when feeding in an opposite direction, to engage the grip blocks 21 and 22 with the bearing member 20, the instant the forward or return stroke of the conveyer has been completed, depending upon the direction of feeding, to prevent lost motion and slipping of said grip blocks during extension or retraction of said extensible trough section. These links, however, perform no feeding function but serve merely to position the grip blocks 21 and 22 in a gripping position at the beginning of the extending or retracting stroke of the conveyer, depending upon the direction it is desired to move said extensible trough section.

The link 65 is connected between the arm 39 of the carrier member 23 and a bracket 67, projecting outwardly from the bracket 18. Said link is adapted to urge the end of said carrier member to which said spring is connected in a forwardly inclined direction, and includes a compression spring 68 encircling a threaded rod 69 and interposed between a collar 70 adjacent one end of said bolt, and a block 71 through which said bolt slidably extends. Said block is pivotally mounted on the bracket 67 in a usual manner. Adjustment of said spring is effected by a nut 72, threaded on said bolt and abutting the forward face of said collar.

The yieldable link 66 includes a threaded rod 76 having a bifurcated forward end which is pivotally connected to the end of the carrier member 23 by means of a vertical pin 75. Said rod slidably extends through a block 77 which is pivotally mounted on a bracket 78, projecting laterally from the bracket 18. A compression spring 79 abuts the rear end of the block 77 at its forward end and is abutted by a collar 81 at its rear end to exert a pulling force on the end of said carrier member to which said spring is connected. A nut 83 abuts the rear end of said collar and serves to effect adjustment of said spring.

The feeding mechanism is shown in a locked position in Figure 3, to lock the extensible trough section 11 for movement with the reciprocable trough section 10. When the mechanism is in this position, the pivotal axes of the pivot pins of the link 35 will be in substantial alignment with the pivotal axis of the pivot pin 49 and the pivotal axes of the pivot pins of the link 36 will be in substantial alignment with the pivotal axis of the pivot pin 64. This will rigidly connect the carrier member 23 to the links 45 and 60 and lock the grip blocks 21 and 22 with the bearing bar 20, the spring links 65 and 66 being held in an inoperative position by the links 35 and 36. The extensible trough section will thus reciprocably move with the reciprocable trough section upon reciprocation of the conveyer. When it is desired to extend said extensible trough section from said reciprocating trough section, the hand lever 62 is swung outwardly, to move the arcuate link 60 from the position shown by full lines in Figure 3 to the position shown by broken lines in this figure. This moves the link 36 in a counterclockwise direction about its axis of connection to the carrier member 23 to an inoperative position, and permits the spring link 66 to exert a pulling force on the carrier member 23. When the hand lever 62 is positioned as described above, the link 35 will exert a forward pushing force on the carrier member 23 upon the forward stroke of the conveyer. This will tend to pivot said carrier member in a counterclockwise direction upon the forward stroke of the conveyer and engage the grip blocks 21 and 22 with the bearing bar 20, to move the extensible trough section 11 forwardly with the reciprocating trough section 10. Upon the return stroke of the conveyer, the link 35 will exert a pulling force on said carrier member against the spring link 66, and tend to pivot said carrier member in a clockwise direction to permit the grip blocks 21 and 22 to be disengaged from the bearing member 20, and permit the reciprocating trough section to move rearwardly with respect to said extensible trough section.

The extensible trough section, being wholly supported on the ground and supporting the forward end of the reciprocating trough section, has sufficient frictional resistance against the ground to prevent its movement with said reciprocating trough section except when engaged by the grip blocks 21 and 22, and to cause opening of the grip blocks when said reciprocating trough section is moving in a direction opposite to a feeding direction.

When it is desired to retract the extensible trough section 11 within the reciprocating trough section 10, the hand lever 53 is swung outwardly, to move the arcuate link 45 from the position shown by solid lines in Figure 3 to the position shown by broken lines in said figure and move the link 35 to an inoperative position, the links 36 and 60 being moved to the position shown by solid lines in said figure by the hand lever 62. When the link 35 is in an inoperative position and the link 36 is in a dead center position with respect to the pins 58 and 64, as shown by solid lines in Figure 3, the link 36 will tend to pivot the carrier member 23 in a clockwise direction against the yieldable link 65 upon the forward stroke of the conveyer, and disengage the grip blocks 21 and 22 from the bearing member 20. Upon the return stroke of the conveyer, the link 36 will exert a pulling force on said carrier member and tend to pivot said carrier member in a counterclockwise direction, to engage said grip blocks with the bearing member 20 and retract said extensible trough section with said reciprocating trough section.

When it is desired that the reciprocating trough section reciprocably move along said extensible trough section, the levers 53 and 62 are both moved in an outward direction to position the links 45 and 60 in the positions shown by dotted lines in Figure 3 and render the links 35 and 36 inoperative. When said links are in this position, the carrier member 23 will be urged in the inclined position shown in Figure 3 by the spring links 65 and 66. The springs of said spring links, however, are sufficiently weak that they will permit the grip blocks 21 and 22 to open and slide along said bearing member, so the extensible trough section may move along the reciprocating trough section.

It may be seen from the foregoing that a simplified feeding device of a compact and low overall height has been provided for a pick-up member of a shaker conveyer trough line, which eliminates vertical swinging motion of the gripping parts during operation of the conveyer and utilizes one set of grip blocks, disposed beneath the pick-up member or extensible trough section of the conveyer, for feeding the extensible trough section in either direction, and which is operated in a simple manner by the manipulation of one hand lever for feeding the extensible trough section in one direction and another hand lever for feeding it in an opposite direction.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer, two trough sections, one of which is extensible with respect to the other, a carrier member, gripping means mounted on said carrier member, means pivotally connected between one trough section and one end of said carrier member, for exerting a positive force on said carrier member to feed said other trough section in one direction, and means pivotally connected between said trough section and an opposite end of said carrier member for exerting a force on said carrier member to feed said trough section in an opposite direction when said first mentioned means is rendered inoperative, and individual control means for said engaging means adapted to render either one of said engaging means inoperative.

2. In a shaker conveyer, two trough sections, one of which is extensible with respect to the other, a carrier member, gripping means mounted on said carrier member, a pair of links pivotally connected between one of said trough sections and opposite ends of said carrier member, means for moving one of said links in position to engage said gripping means with said other trough section upon certain strokes of the conveyer, for feeding said trough section in one direction, and means for moving the other of said links in position to engage said gripping means with said other trough section upon certain other strokes of the conveyer when said first mentioned link is inoperative, for feeding said trough section in an opposite direction.

3. In a shaker conveyer, two trough sections, one of which is extensible with respect to the other, a carrier member, gripping means mounted on said carrier member, a pair of links pivotally connected between one of said trough sections and opposite ends of said carrier member, one of said links being adapted to engage said gripping means with said other trough section upon certain strokes of the conveyer, for feeding said trough section in one direction, and the other of said links being adapted to engage said gripping means with said other trough section upon certain other strokes of the conveyer, for feeding said trough section in an opposite direction, and individual control means for rendering either of said links inoperative.

4. In a shaker conveyer, two trough sections, one of which is extensible with respect to the other, a carrier member, gripping means mounted on said carrier member, a pair of links pivotally connected between one of said trough sections and opposite ends of said carrier member, one of said links being adapted to engage said gripping means with said other trough section upon certain strokes of the conveyer, for feeding said trough section in one direction, and the other of said links being adapted to engage said gripping means with said other trough section upon certain other strokes of the conveyer, for feeding said trough section in an opposite direction, yieldable means having connection with opposite ends of said carrier member for urging said carrier member in a position to engage said gripping means with said other trough section, and individual control means for rendering either of said links inoperative and permitting the other link to feed said extensible trough section in the desired direction.

5. In a feeding device for shaker conveyers, two trough sections, one of which is extensible with respect to the other, means operable solely by the action of the conveyer due to frictional resistance of the extensible trough section on the ground, for extending or retracting said extensible trough section with respect to said other trough section including a carrier member, a pair of grip blocks carried by said carrier member, means pivotally connected between one trough section and one end of said carrier member and operable to exert a force on one end of said carrier member in a direction to cause said carrier member to engage said grip blocks with said extensible trough section upon certain strokes of the conveyer, to feed said extensible trough section with respect to the other trough section in one direction, and other means pivotally connected between said trough section and an opposite end of said carrier member and operable to exert a force on an opposite end of said carrier member in a direction to cause said carrier member to engage said grip blocks with said extensible trough section upon certain other strokes of the conveyer, to feed said extensible trough section in an opposite direction, and individual control means for rendering either one of said engaging means inoperative including a pair of hand levers and connections from said hand levers to said engaging members.

6. In a feeding device for shaker conveyers, a reciprocating trough section, an extensible trough section, and means operable solely by the action of the conveyer due to frictional resistance of said extensible trough section with the ground, for extending or retracting said extensible trough section with respect to said reciprocating trough section including a carrier member, a pair of grip blocks pivotally carried by said carrier member, a bearing bar extending along said extensible trough section, means pivotally connected between said reciprocating trough section and one end of said carrier member for exerting a force on one end of said carrier member in a direction to engage said grip blocks with said bearing bar upon certain strokes of the conveyer and feed said extensible trough section in one direction, means pivotally connected between said reciprocating trough section and an opposite end of said carrier member for exerting a force on the other end of said carrier member in a direction to engage said grip blocks with said bearing bar upon certain other strokes of the conveyer, for feeding said extensible trough section in an opposite direction, and individual control means for rendering either of said engaging means inoperative.

7. In a feeding device for shaker conveyers, a reciprocating trough section, an extensible trough section, and means operable solely by the action of the conveyer due to frictional resistance of said extensible trough section with the ground, for extending or retracting said extensible trough section with respect to said reciprocating trough section including a carrier member, a pair of grip blocks pivotally carried by said carrier member, a bearing bar extending along said extensible trough section, means connected between said reciprocating trough section and carrier member and selectively operable to exert a force on one end of said carrier member in a direction to engage said grip blocks with said bearing bar upon certain strokes of the conveyer and feed said extensible trough section in one direction, other means selectively operable to exert a force on the other end of said carrier member in a direction to engage said grip blocks with said bearing bar upon certain other strokes of the conveyer, for feeding said extensible trough section in an opposite direction when said first mentioned means is inoperative, and yieldable means connected with opposite ends of said carrier member, to urge said carrier member to an inclined position to permit said gripping means to engage said bearing bar.

8. In a feeding device for shaker conveyers, a reciprocating trough section, an extensible trough section, and means operable solely by the action of the conveyer due to frictional resistance of said extensible trough section with the ground, for extending or retracting said extensible trough section with respect to said reciprocating trough section including a carrier member, a pair of grip blocks pivotally carried by said carrier member, a bearing bar extending along said extensible trough section, means connected between said reciprocating trough section and carrier member for exerting a force on one end of said carrier member in a direction to engage said grip blocks with said bearing bar upon certain strokes of the conveyer and feed said extensible trough section in one direction, means exerting a force on the opposite end of said carrier member to engage said grip blocks with said bearing bar upon certain other strokes of the conveyer, for feeding said extensible trough section in an opposite direction, yieldable means having connection with opposite ends of said carrier member, to urge said carrier member to an inclined position to permit said gripping means to engage said bearing bar, and individual control means operated from one side of the conveyer, to render either of said engaging means inoperative and control the direction of feeding movement of said extensible trough section.

9. In a feeding device for shaker conveyers, a reciprocating trough section, an extensible trough section, and means operable solely by the action of the conveyer due to frictional resistance of said extensible trough section with the ground, for extending or retracting said extensible trough section with respect to said reciprocating trough section including a bearing bar extending along said extensible trough section, a carrier member, a pair of grip blocks pivotally carried by said carrier member and adapted to engage said bearing bar, a link pivotally connected between said reciprocating trough section and one end of said carrier member, manually operable means to position said link to exert a force on said carrier member in a direction to engage said grip blocks with said bearing bar upon the forward strokes of the conveyer, or selectively move said link to an inoperative position, another link pivotally connected between said reciprocating trough section and the opposite end of said carrier member, manually operable means to position said link to exert a force on said carrier member in a direction to engage said grip blocks with said bearing bar upon the return strokes of the conveyer or selectively move said link to an inoperative position.

10. In a feeding device for shaker conveyers, a reciprocating trough section, an extensible trough section, and means operable solely by the action of the conveyer due to frictional resistance of said extensible trough section with the ground, for extending or retracting said extensible trough section with respect to said reciprocating trough section including a bearing bar extending along said extensible trough section, a carrier member, a pair of grip blocks pivotally carried by said carrier member, a link pivotally connected between said reciprocating trough section and one end of said carrier member, manually operable means to position said link to exert a force on one end of said carrier member in a direction to engage said grip blocks with said bearing bar upon the forward strokes of the conveyer, or selectively move said link to an inoperative position, another link pivotally connected between said reciprocating trough section and the opposite end of said carrier member, manually operable means to position said link to exert a force on said carrier member in a direction to engage said grip blocks with said bearing bar upon the return strokes of the conveyer, and yieldable means connected between said reciprocating trough section and opposite ends of said carrier member to urge said carrier member to an inclined position to engage said gripping means with said bearing bar immediately upon the feeding stroke of the conveyer.

11. In a self-loading device for shaker conveyers, two reciprocating trough sections, one of which is extensible with respect to the other, and means for moving said extensible trough section relative to said other trough section including a carrier member disposed beneath and extending transversely of said extensible trough section and having gripping means thereon engageable with said extensible trough section during certain strokes of the conveyer, and means pivotally connected between said other trough section and opposite ends of said carrier member and selectively movable to positions to transmit a positive force from said trough section to either end of said carrier member, to extensibly or retractibly move said extensible trough section with respect to said other trough section.

12. In a self-loading device for shaker conveyers, a reciprocating trough section, an extensible trough section mounted for telescopic movement with respect to said reciprocating trough section, and means operable by reciprocable movement of the conveyer for moving said extensible trough section relatively to said reciprocating trough section including a carrier member disposed beneath and extending transversely of said extensible trough section and having gripping means carried thereby adapted to engage said extensible trough section during certain strokes of the conveyer, and a pair of movable links pivotally connected between opposite ends of said carrier member and having adjustable connection with said reciprocating trough section, either one of said links being movable to a position to positively lock the end of said carrier member to which it is connected for reciprocable movement with said reciprocating trough section, to cause said locked link to exert a force on said carrier member to grippingly engage said gripping means with said extensible trough section during certain strokes of the conveyer, and to exert a force on said carrier member in an opposite direction to release said gripping means during the opposite strokes of the conveyer.

ERNST R. BERGMANN.